United States Patent
Skowaisa et al.

(10) Patent No.: US 10,996,096 B2
(45) Date of Patent: May 4, 2021

(54) ARRANGEMENT FOR DETERMINING AND DISPLAYING THE OPTIMAL MATERIAL THICKNESS WHEN MEASURING FILL LEVELS USING RADAR SENSORS

(71) Applicant: VEGA GRIESHABER KG, Wolfach (DE)

(72) Inventors: Juergen Skowaisa, Schiltach (DE); Clemens Hengstler, Haslach (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 16/436,179

(22) Filed: Jun. 10, 2019

(65) Prior Publication Data

US 2019/0293472 A1    Sep. 26, 2019

Related U.S. Application Data

(63) Continuation of application No. 15/403,332, filed on Jan. 11, 2017, now Pat. No. 10,378,948.

(30) Foreign Application Priority Data

Feb. 1, 2016 (DE) .................. 10 2016 101 756.6

(51) Int. Cl.
*G01F 23/284* (2006.01)
*G01S 13/10* (2006.01)
(Continued)

(52) U.S. Cl.
CPC ............ *G01F 23/284* (2013.01); *G01S 7/062* (2013.01); *G01S 13/10* (2013.01); *G01S 13/88* (2013.01); *H01Q 1/422* (2013.01)

(58) Field of Classification Search
CPC . G01F 17/00–17; H01Q 17/00–17/008; G01S 13/88
See application file for complete search history.

(56) References Cited

U.S. PATENT DOCUMENTS

| | | | | |
|---|---|---|---|---|
| 4,566,321 A | * | 1/1986 | Zacchio | G01F 23/284 73/290 R |
| 4,670,754 A | * | 6/1987 | Zacchio | G01F 23/284 342/124 |

(Continued)

FOREIGN PATENT DOCUMENTS

| | | |
|---|---|---|
| CN | 1243243 A | 2/2000 |
| CN | 101061373 A | 10/2007 |

(Continued)

OTHER PUBLICATIONS

Office Action from the Chinese Patent Office for parallel application 201710053804.1, dated Dec. 2, 2019.

(Continued)

*Primary Examiner* — Peter M Bythrow
(74) *Attorney, Agent, or Firm* — William Gray Mitchell

(57) ABSTRACT

The invention is a measuring arrangement for measuring a fill level in a container with a radar level gauge according to the delay principle, which comprises an adaptation for reducing electromagnetic radiation reflected by the surfaces of the wall of the container as well as a method for optimizing the adaptation and for reducing stray radiation, for example radiation reflected by the container walls, with here display devices indicating if stray radiation is sufficiently reduced.

11 Claims, 2 Drawing Sheets

(51) Int. Cl.
*G01S 13/88* (2006.01)
*H01Q 1/42* (2006.01)
*G01S 7/06* (2006.01)

(56) References Cited

U.S. PATENT DOCUMENTS

| | | | | |
|---|---|---|---|---|
| 5,012,248 A * | 4/1991 | Munro | G01B 15/025 | 342/124 |
| 5,115,218 A * | 5/1992 | Jean | H01P 1/08 | 333/252 |
| 5,147,718 A * | 9/1992 | Papoulias | C09D 5/32 | 428/212 |
| 5,202,688 A * | 4/1993 | Hubbard | H01Q 17/00 | 342/1 |
| 5,262,743 A * | 11/1993 | Jean | H01P 1/08 | 333/252 |
| 5,539,322 A * | 7/1996 | Zoughi | G01B 15/02 | 324/642 |
| 5,703,289 A * | 12/1997 | Mulrooney | G01F 23/284 | 333/252 |
| 5,770,990 A * | 6/1998 | Lubbers | G01F 23/284 | 333/252 |
| 6,023,246 A * | 2/2000 | Tanabe | H01Q 19/08 | 343/753 |
| 6,658,932 B2 * | 12/2003 | Munley | G01F 23/284 | 333/252 |
| 6,834,546 B2 * | 12/2004 | Edvardsson | G01F 23/284 | 340/612 |
| 6,984,976 B1 * | 1/2006 | Tam | G01B 15/02 | 324/229 |
| 8,044,843 B2 * | 10/2011 | Baath | G01F 23/284 | 324/600 |
| 8,531,329 B2 * | 9/2013 | Mahler | G01B 7/10 | 342/22 |
| 9,091,584 B2 * | 7/2015 | Vogt | G01F 23/284 | |
| 2002/0034123 A1 * | 3/2002 | Fuenfgeld | G01S 13/106 | 367/99 |
| 2002/0067229 A1 * | 6/2002 | Lubbers | H01P 1/08 | 333/252 |
| 2009/0158839 A1 * | 6/2009 | Spanke | G01F 23/284 | 73/290 V |
| 2009/0235736 A1 * | 9/2009 | Spanke | G01F 23/284 | 73/290 V |
| 2010/0066594 A1 * | 3/2010 | Kienzle | H01Q 1/225 | 342/175 |
| 2010/0223019 A1 * | 9/2010 | Griessbaum | G01F 23/2962 | 702/75 |
| 2012/0007768 A1 * | 1/2012 | Hemmendorff | G01F 23/284 | 342/124 |
| 2012/0158363 A1 * | 6/2012 | Hammer | G01D 3/10 | 702/183 |
| 2013/0113500 A1 * | 5/2013 | Chen | H01Q 1/225 | 324/637 |
| 2013/0228011 A1 * | 9/2013 | Pohl | H01P 1/08 | 73/290 V |
| 2014/0047917 A1 * | 2/2014 | Vogt | H01Q 19/062 | 73/290 V |
| 2015/0132557 A1 * | 5/2015 | Durant | G02B 5/003 | 428/215 |
| 2016/0041023 A1 * | 2/2016 | Ito | H01Q 1/225 | 342/124 |
| 2016/0098500 A1 * | 4/2016 | Haran | G01S 7/40 | 703/2 |
| 2016/0117426 A1 * | 4/2016 | Savard | G01F 23/0069 | 703/2 |
| 2016/0292893 A1 * | 10/2016 | Wennerberg | G01F 25/0076 | |
| 2017/0059691 A1 * | 3/2017 | Fischer | G01S 7/023 | |
| 2017/0077601 A1 * | 3/2017 | Linkies | G01S 13/88 | |
| 2017/0162947 A1 * | 6/2017 | Kanhere | H01Q 15/0013 | |
| 2017/0268922 A1 * | 9/2017 | Heath | G08B 21/187 | |
| 2017/0288314 A1 * | 10/2017 | Kagawa | H01Q 17/007 | |
| 2017/0302001 A1 * | 10/2017 | Serneby | H01Q 19/106 | |
| 2017/0317424 A1 * | 11/2017 | Sim | H01Q 17/00 | |
| 2018/0069319 A1 * | 3/2018 | Cho | B32B 9/045 | |
| 2018/0127599 A1 * | 5/2018 | Wentz | C09D 7/40 | |

FOREIGN PATENT DOCUMENTS

| | | |
|---|---|---|
| CN | 103594760 A | 2/2014 |
| EP | 1707983 B1 | 10/2006 |
| WO | WO 03050483 A1 | 6/2003 |

OTHER PUBLICATIONS

Devine, Peter: "Rillstandmessung mit Radar—Leitfaden far die Prozessindustrie", VEGA Grieshaber KG, [2002], ISBN 3-00-008216-3; Kapitel 6, S. 135ff, 2002.

German office action for related application 10 2016 101 756.6, dated Nov. 17, 2016, 2016.

* cited by examiner

ARRANGEMENT FOR DETERMINING AND DISPLAYING THE OPTIMAL MATERIAL THICKNESS WHEN MEASURING FILL LEVELS USING RADAR SENSORS

CROSS REFERENCE TO RELATED APPLICATIONS

This patent application claims priority U.S. patent application Ser. No. 15/403,332, filed on Jan. 11, 2017, and thereby to German Patent Application 10 2016 101 756.6, filed on Feb. 1, 2016.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to an arrangement for determining and displaying the optimal material thickness when measuring fill levels using radar sensors.

Background of the Invention

The present invention relates to a measuring arrangement with a radar fill gauge, for example according to a delay principle for measuring the fill level in a container, several methods for reducing the electromagnetic radiation of a measuring arrangement reflecting from the surfaces of a wall, preferably a synthetic wall, and the use of a measuring arrangement for determining the fill level of a fill good in a container.

A measuring arrangement is described for measuring a fill level in a container using a radar fill gauge, which comprises an adaptation for reducing the electromagnetic radiation reflected by the surfaces of a wall of the container, as well as a method for optimizing the adaptation and for reducing stray radiation, for example radiation reflected by the container walls, with the display devices indicating if interfering radiation has been sufficiently reduced.

Fill level arrangements for determining and/or monitoring a fill level in a container are known in various embodiments. Radar level gauges, for example operating according to the delay principle, emit electromagnetic radiation pulses of a certain wavelength and then detect the temporal progression of the reflected electromagnetic radiation as an echo curve. Here, not only reflections at the surface of the liquid to be measured are detected but also a plurality of stray reflections, such as reflections at the walls of the container, in which the liquid to be detected is stored, reflections at the bottom of the container, or also reflections at the container lid. The sum of reflections generate a signal which is measured as a function of time and which as an echo curve detects usually several maximums and displays them in reference to time. From the progression of this echo curve then the fill level of the liquid located in the container shall be determined.

In FMCW-Radar (Frequency Modulated Continuous Wave) a high-frequency signal is used in which during the measuring process the transmission frequency is altered, for example linearly inclines. Here, the frequency change usually amounts to up to approximately 10 percent of the transmission frequency of the high-frequency signal. The signal is emitted, reflected at the surface of the fill good, and received with a time delay. From the present transmission frequency and the frequency received the difference $\Delta f$ is formed for further signal processing. It is directly proportional to the distance, i.e. a great frequency difference measured represents a large distance and vice versa. This frequency difference is then converted via a Fourier transformation into a frequency spectrum and then the product distance is calculated. The fill level results from the difference of the fill level and the distance.

Particularly disturbing in radar level gauge arrangements are usually the reflections at the container lid, which, if it is arranged between the level gauge and the fill good, must allow penetration of incident electromagnetic radiation, and thus it must be made from a material that is permeable for incident electromagnetic radiation pulses, for example made from a synthetic material, or it must comprise at least a window through which the electromagnetic radiation pulse emitted by the radar level gauge can penetrate into the interior of the container.

The stray reflections, particularly the stray reflections at the container lid, here lead to the consequence that the fill level of the liquid or the bulk good to be determined and located in the container cannot be determined precisely, which leads to a faulty measurement due to the stray reflections. The stray reflections must therefore be minimized.

The objective of the present invention is therefore to provide a measuring arrangement showing an adaptation by which the electromagnetic waves reflected by the surfaces of the container lid and/or by the surfaces of a wall arranged between the fill good and the radar level gauge are reduced such that the fill level to be determined of the liquid which is located in the container or the bulk good located in the container can be determined more precisely. Another objective of the invention is to provide a method for reducing electromagnetic radiation reflected by the surfaces of the container lid and/or the wall.

The objective is attained in a measuring arrangement and a method, each as described herein.

BRIEF SUMMARY OF THE INVENTION

In a preferred embodiment, a measuring arrangement (1) comprising
a container (4) allowing that its interior (2) is filled with a fill good (6),
a radar measuring device (12) arranged outside the container (4) and aligned to the interior chamber (2) of the container (4), embodied as a radar level gauge, which emits electromagnetic waves of at least one wavelength and capable to detect the progression of the reflected electromagnetic radiation of at least one wavelength as an echo curve, a wall (10) arranged between the interior chamber (2) of the container (4) and the radar measuring device (12), at least partially permeable for the electromagnetic radiation of at least one wavelength, a detection unit (30) for detecting the echo curve, an adaptation (14) for reducing electromagnetic radiation reflected from the surfaces of the wall (10), characterized in that the adaptation (14) comprises at least one self-adhesive synthetic film (16) and/or synthetic plate and/or one glued to the wall (10) and/or resting on the wall, at least partially permeable for electromagnetic radiation of at least one wavelength, which adheres to the wall (10) and/or is glued to the wall (10) such that the electromagnetic radiation pulses emitted by the radar level gauge (12) penetrate at least one synthetic film (16).

In another preferred embodiment, the measuring arrangement (1) as described herein, characterized in that the detection unit (30) comprises a storage unit (34) in which at least a portion of the echo curve, which shows electromagnetic radiation reflected at the surfaces of the adaptation (14) and the wall (10), can be saved as a function of time.

In another preferred embodiment, the measuring arrangement (1) as described herein, characterized in that a time frame (26) is determined in which the echo curve (20) shows at least a portion of the electromagnetic radiation reflected by the surfaces of the wall (10).

In another preferred embodiment, the measuring arrangement (1) as described herein, characterized in that the detection unit (30) comprises a comparator (38), which compares the measurements of the echo curve (20) at a certain time frame to respective values of a predetermined reference curve (36).

In another preferred embodiment, the measuring arrangement (1) as described herein, characterized in that the detection unit (30) comprises an evaluation unit (46), which determines an energy value from the progression of the echo curve within a certain time frame and transmits it to a comparator (38) which compares the energy value to a predetermined reference value (48).

In another preferred embodiment, the measuring arrangement (1) as described herein, characterized in that the detection unit (30) transmits an ok-signal to a display device (42) when the predetermined reference value (48) is higher than the energy value determined in a certain time frame (26) and/or when the measurements of the echo curve (20) in this period are below the values of the reference curve (36) equivalent to the respective measurements.

In another preferred embodiment, the measuring arrangement (1) as described herein, characterized in that the display device (42) represents an optic and/or acoustic display element, with the display device (42) preferably being embodied as a LED or as an electronic display.

In another preferred embodiment, the measuring arrangement (1) as described herein, characterized in that the adaptation (14) comprises several, preferably two, three, four, or five synthetic films (16) adhered to each other and/or glued to each other in layers.

In another preferred embodiment, the measuring arrangement (1) as described herein, characterized in that the synthetic films (16) show approximately identical thicknesses.

In another preferred embodiment, the measuring arrangement (1) as described herein, characterized in that the synthetic films (16) are made from the same material, with the material preferably being adjusted to the dielectricity constant of the wall (10).

In an alternate preferred embodiment, a method for reducing electromagnetic radiation of a measuring arrangement (1), reflected by the surfaces of a wall (10) and from the surfaces of an adaptation (14) adhered to the surface of the wall and/or glued thereto, according to one of claims 1 to 10 characterized in that the following steps are performed successively:

a) placement and/or adhesion of a synthetic film (16) on the wall (10), b) irradiation of the interior chamber of a container (4) preferably made from a synthetic material, through the synthetic film (16) with an electromagnetic radiation pulse emitted by the radar level gauge (12) and time-based recording of the intensity of the electromagnetic radiation reflected into the radar level gauge (12) as an echo curve (20), c) determination of a period (26) of the echo curve (20) in which the echo curve (20) comprises at least a portion of the electromagnetic radiation reflected at the surfaces of the wall (10) and the synthetic film (16) and determination of the energy value of the radiation pulse detected in said period (26) from the intensity of the reflected electromagnetic radiation recorded within said period (26), d) placement and/or adhesion of another synthetic film (16) onto the already placed and/or adhered synthetic film (16), e) renewed irradiation of the interior chamber (2) of the container (4) through the synthetic film (16) with an electromagnetic radiation pulse emitted by the radar level gauge (12), recording the echo curve (20) and determination of the energy value of the radiation pulse detected within said period (26), f) placement and/or adhesion of another synthetic film (16) onto the synthetic film and subsequent execution of step e) if the most recently determined energy value is smaller than the previously determined energy value, g) saving the most recently determined energy value in a storage unit (34), if the most recently determined energy value is greater or identical to the previously determined energy value.

In another preferred embodiment, the method as described herein, characterized in that a reference value (48) is determined, which is above the lowest determined energy value, and is saved in another storage unit (36) of the measuring arrangement (1), with the reference value (48) preferably being selected between the lowest energy value determined and the second-to-lowest energy value determined.

In another preferred embodiment, the method as described herein, characterized in that after step g) the most recently applied and/or adhered synthetic film (16) is removed.

In another alternate embodiment, a method for reducing electromagnetic radiation of a measuring arrangement (1), reflected by the surfaces of a wall (10) and by the surfaces of an adaptation (14) adhering at the surface of the wall and/or glued thereto, according to one of claims 1 to 10 characterized in that the following steps are performed successively:

a) placement and/or adhesion of a synthetic film (16) on the wall (10), b) irradiation of the interior chamber of the container (4) through the synthetic film (16) with an electromagnetic radiation pulse emitted by the radar level gauge (12)

c) time-based recording of the intensity of the electromagnetic radiation reflected into the radar level gauge (12) as an echo curve (20), d) determining a period (26) of the echo curve (20) in which the echo curve (20) shows at least a portion of the electromagnetic radiation reflected at the surfaces of the wall (10) and the synthetic film (16), e) determination of the energy value of the radiation pulse detected in the period (26) from the intensity of the reflected electromagnetic radiation recorded in the period (26) and comparison of the determined energy value to a predetermined reference value, f) placement and/or adhesion of another synthetic film (16) on the synthetic film and subsequent execution of step e) when the most recently determined energy value is greater than the reference value, g) transmission of an ok-signal to a display device (42) when the predetermined reference value (48) is greater than the energy value determined in the respective period (26)

In a final alternate embodiment, a method of use of the measuring arrangement (1) as described herein for determining the fill level (8) of a fill good (6) in the container (4).

DETAILED DESCRIPTION OF THE INVENTION

Figure 1:
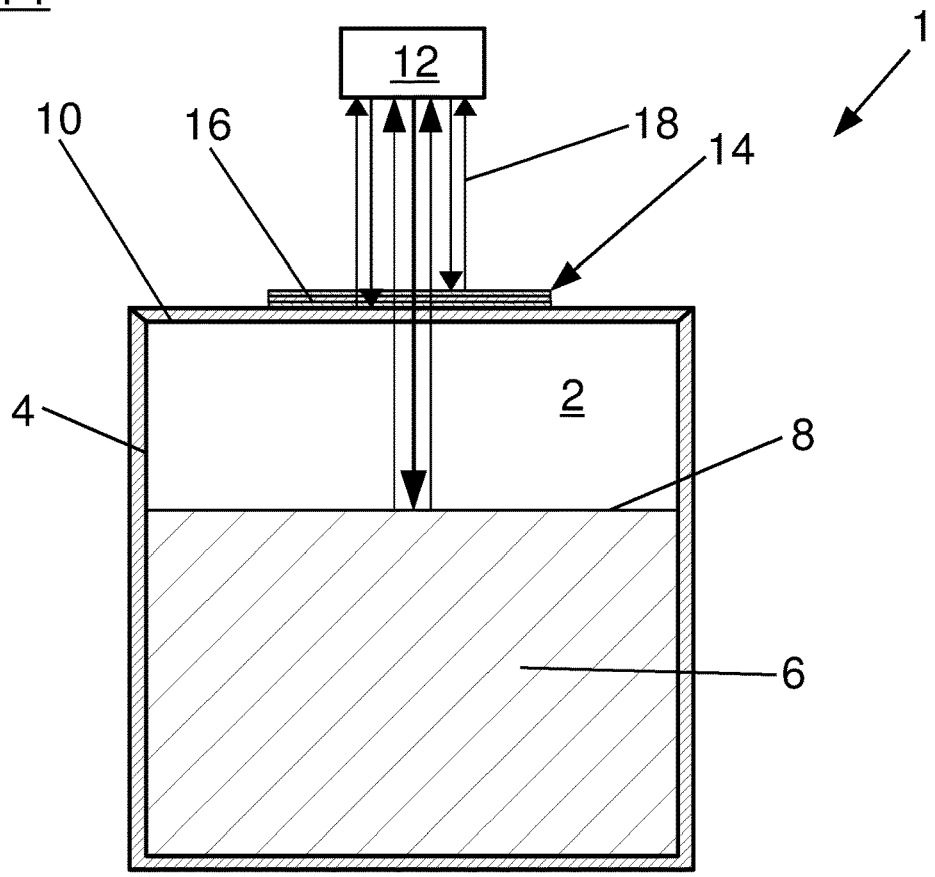
FIG. 1 is a line drawing evidencing a schematic illustration of a measuring arrangement according to the invention.

The measuring arrangement according to the invention comprises a container, the interior chamber of which can be filled with a fill good, a radar measuring device arranged outside the container and directed towards the interior chamber of the container, embodied as a radar level gauge, particularly according to the delay principle, which can emit electromagnetic radiation pulses and/or electromagnetic waves of at least one wavelength and can detect the progression, particularly the temporal progression of the reflected electromagnetic radiation of at least one wavelength as an echo curve, a wall arranged between the interior chamber of the container and the radar measuring device, for example in the form of a plastic lid, which is at least partially permeable for electromagnetic waves of at least one wavelength, a detection unit for a preferably time-based detection of the echo curve, as well as an adaptation for reducing the electromagnetic radiation reflected by the surfaces of the wall.

According to the invention, the adaptation shows at least one, preferably a self-adhesive and/or glued to the wall synthetic film or synthetic plate, at least partially permeable for electromagnetic radiation of at least one wavelength, which adheres to the wall and/or is glued to the wall and/or rests on the wall such that the electromagnetic radiation pulses emitted by the radar level gauge penetrate at least one synthetic film or synthetic plate. The synthetic film or the synthetic plate can also simply rest on the wall. The wall is preferably a synthetic wall. In this application, synthetic plates shall also be called synthetic films.

Due to the fact that the adaptation shows at least one self-adhesive and/or glued to the wall synthetic film, at least partially permeable for electromagnetic radiation of at least one wavelength, in case of a suitable thickness and an adapted dielectricity constant of at least one synthetic film it can be achieved that the stray reflections at the surfaces of the wall and/or the synthetic films at least partially compensate each other such that stray reflections are reduced.

The adaptation may also show several, preferably two, three, four, or five adhered synthetic films and/or films glued to each other in layers.

In a preferred embodiment, the synthetic films show approximately identical thicknesses. They may be made from the same material, for example, as the material the of wall. This material is preferably adapted to the dielectricity constant of the wall. By using several synthetic films with identical thicknesses, adhered to each other and/or or glued to each other, and identical dielectricity constants it is easier possible to achieve an optimal layer thickness in a gradually performed method in which the electromagnetic radiation reflected by the surfaces of the synthetic films and the surfaces of the wall is minimized.

The container is preferably made from a synthetic material and/or it shows at least a container lid made from a synthetic material, and through this lid the fill level in the container is determined.

The stray reflections of the surfaces of the window materials of the container lid or the surfaces of the container lid penetrated by the electromagnetic radiation emitted by the radar measuring device or the synthetic containers in which a radar sensor is used for measuring the fill level are therefore reduced by reflection-reducing layers, with their thickness potentially being altered continuously or in certain steps. The layers are preferably made from the same material as the medium to be penetrated and/or they show a similar dielectricity constant. By an overall thickness, which is equivalent to half the wavelength or a multiple thereof in the material to be penetrated, a destructive interference is yielded, thus a compensation of the reflection of the incident signal and the emitted signal. Although in practice the thickness can be adapted only approximately, because a certain bandwidth of the transmission frequency is required for the measurement, in spite thereof by the type of adaptation the reflection can be considerably reduced, though.

An important feature of the invention is the option for visualizing these stray reflections in a display, preferably in the sensor. This visualization can either occur by the graphic illustration of the echo curve and its visual evaluation or by an analog or digital information regarding the intensity of the stray reflection. Based on the display then an adaptation of the reflection reducing layer is possible. In order to display the intensity of the stray reflection here for example an analog or digital display may be used. However, it is also possible to visualize with a simple multi-colored display how well the adaptation has occurred. For example, a red light display may signal poor adaptation, a yellow light display a moderate adaptation, and a green display a good adaptation.

The detection unit may for example show a storage unit in which at least a portion of the echo curve is saved as a function of time, which shows the electromagnetic radiation reflected at the surfaces of the adaptation and the wall.

In order to determine the stray reflections to be minimized preferably a period is determined in which the echo curve shows at least a portion of the electromagnetic radiation reflected by the surfaces of the wall.

The detection unit may show a comparator which compares the measurements of the echo curve in the determined period with respective values of a predetermined reference curve. If for example all measurements of the echo curve in the respective period are below the corresponding values of the predetermined reference curve the comparator may for example forward an ok-signal to a display device. The display device then indicates that the stray reflections have been sufficiently minimized.

The detection unit may also show an evaluation unit, which determines an energy value from the progression of the echo curve in the respective period, for example by adding the individual values detected within said period, and feeding it to a comparator which compares this energy value to a predetermined reference value. In this case the comparator may also transmit for example an ok-signal to a display device, when the reference value is for example greater or identical to the value determined by the evaluation unit.

The display device may represent an optical and/or an acoustical display element, with the display device preferably being embodied as a LED or as an electronic display.

With such a measuring arrangement, a method can be implemented for reducing electromagnetic radiation reflected by the surfaces of a wall or by the surfaces of an adaptation adhering at a surface of this wall and/or glued thereto.

In this method, initially a synthetic film is placed and/or adhered on the wall to which the radar level gauge is aligned. Then the interior chamber of the container is irradiated through the synthetic film and through this wall with an electromagnetic radiation pulse emitted by the radar level gauge and the intensity of the electromagnetic radiation reflected into the radar level gauge is recorded as an echo curve.

Now a period of the echo curve is determined in which the echo curve comprises at least a portion of the electromagnetic radiation reflected at the surfaces of the wall and the synthetic film and the energy value is determined of the radiation pulse detected in this period from the intensity of the electromagnetic radiation reflected and recorded within this period. This energy value is preferably saved.

Subsequently another synthetic film is placed and/or adhered on the already placed and/or adhered synthetic film and the interior chamber of the container is once more irradiated through the synthetic film with an electromagnetic radiation pulse emitted by the radar level gauge. The echo curve resulting from this radiation pulse is also detected and recorded. Then the energy value is determined from the once more detected radiation pulse in the already determined period and is also saved preferably.

If the most recently determined energy value is smaller than the previously determined energy value another synthetic film is placed and/or adhered on the surface of the uppermost synthetic film, and after another irradiation of the interior chamber of the container by an electromagnetic radiation pulse emitted by the radar level gauge through the additional synthetic film the echo curve is recorded, and the energy value is determined of the radiation pulse detected at the respective period.

If the most recently determined energy value is however greater or identical to the previously determined energy value it can be signaled to the operator, for example via a display device, that the most recently determined energy value is greater or identical in reference to the previously determined energy value, indicating to the operator that the optimal number of synthetic films adhered on each other and/or glued to each other has been reached or exceeded. The most recently determined energy value is saved in a storage unit.

With the help of this method it is possible to gradually minimize stray reflections and gradually optimize the adaptation of the measuring arrangement adhering to a wall and/or glued thereto.

For reasons of comparison, a reference value can be determined via the smallest determined energy value and saved in another storage unit of the measuring arrangement, with the reference value preferably being selected between the smallest determined energy value and the second smallest energy value determined, so that a comparator can compare the energy value determined in the respective period to the predetermined reference value and an ok-signal can be transmitted to a display device when the predetermined reference value is higher than the energy value determined in the respective period.

This way the fill level of the bulk good filled in the interior chamber of the container up to a fill level or a liquid filled in the interior chamber of the container up to a fill level can be determined more precisely because the maximum value equivalent to the fill level is shifted less in the echo curve at lower stray reflections at the container lid, which also form maximums in the echo curve adjacent to the fill level maximum.

In one preferred embodiment of the method, after the last processing step, the most recently applied and/or adhered synthetic film is removed.

The above-described measuring arrangement can be used to determine the fill level of a fill good in a container. The adaptation shows here preferably so many synthetic films of identical thickness and identical material composition arranged on top of each other such that the energy reflected by the surfaces of the wall and the synthetic films assumes a minimal value.

Of course, it is also possible to alter the above-described method accordingly and, instead of energy values to be determined in a certain period from the echo curve, to directly use the values of the echo curve and to compare them individually with the values of a respective reference curve. If in this case the most recently recorded intensity values of the echo curve are smaller or identical to the intensity values of a respective reference curve within a certain period an ok-signal can be forwarded to a display device.

A preferred method for reducing electromagnetic radiation of a measuring device reflected by the surfaces of a wall or the surfaces of an adaptation adhering to the surfaces or glued to the surface of the wall provides that successively the following steps are performed.

Initially a synthetic film is placed on the wall and/or adhered thereto. Subsequently the interior chamber of the container is irradiated through the synthetic film with an electromagnetic radiation pulse emitted by the radar level gauge.

The intensity of the electromagnetic radiation reflected into the radar level gauge is recorded in reference to time as an echo curve and the period of the echo curve is determined in which the echo curve comprises at least a portion of the electromagnetic radiation reflected at the surfaces of the wall and the synthetic film.

Subsequently the energy value of the radiation pulse detected in the respective period is determined from the intensity of the reflected electromagnetic radiation detected and recorded within said period and this energy value is compared to a predetermined reference value.

If the most recently determined energy value is greater than the reference value, another synthetic film is placed on and/or adhered to the synthetic film and the energy value of the radiation pulse detected in a respective period is once more determined from the intensity of the electromagnetic radiation reflected and recorded in said period and again compared to the predetermined reference value.

However, if the predetermined reference value is greater than the energy value determined for the respective period an ok-signal is transmitted to the display device so that it is hereby indicated that the measuring arrangement can now be used for determining the fill level of a fill good in a container.

The designations used in the following description, such as "top", "bottom", "left", and "right" and the like refer to the exemplary embodiments and shall not be limiting in any way, even when they refer to preferred embodiments.

DETAILED DESCRIPTION OF THE FIGURES

FIG. 1 shows the schematic design of the measuring arrangement 1 according to the invention. A fill good 6 is filled up to a fill level 8 in the interior chamber 2 of a container 4. A wall 10 is arranged as a lid on the container 4 through, which the fill level 8 of the fill good 6 is measured with the radar level gauge 12. An adaptation 14 is adhered to the exterior surface of the wall 10, which is made from several layers of synthetic films 16 adhered over top of each other, which are at least partially permeable for the wavelengths of the radiation pulses emitted by the radar level gauge 12 and/or the radar measuring device 12. A portion of the pulsed radiation emitted by the radar measuring device 12 is reflected by the surface 8 of the fill good 6, which radiation penetrates through the adaptation 14 and the wall 10 into the interior chamber 2 of the container 4, and is reflected back to the radar level gauge 12. A portion of the electromagnetic radiation reflected by the surfaces of the wall 10 and the surfaces of the adaptation 14 also impinges the radar measuring device 12 and is here detected as a stray reflection 18.

Figure 2:
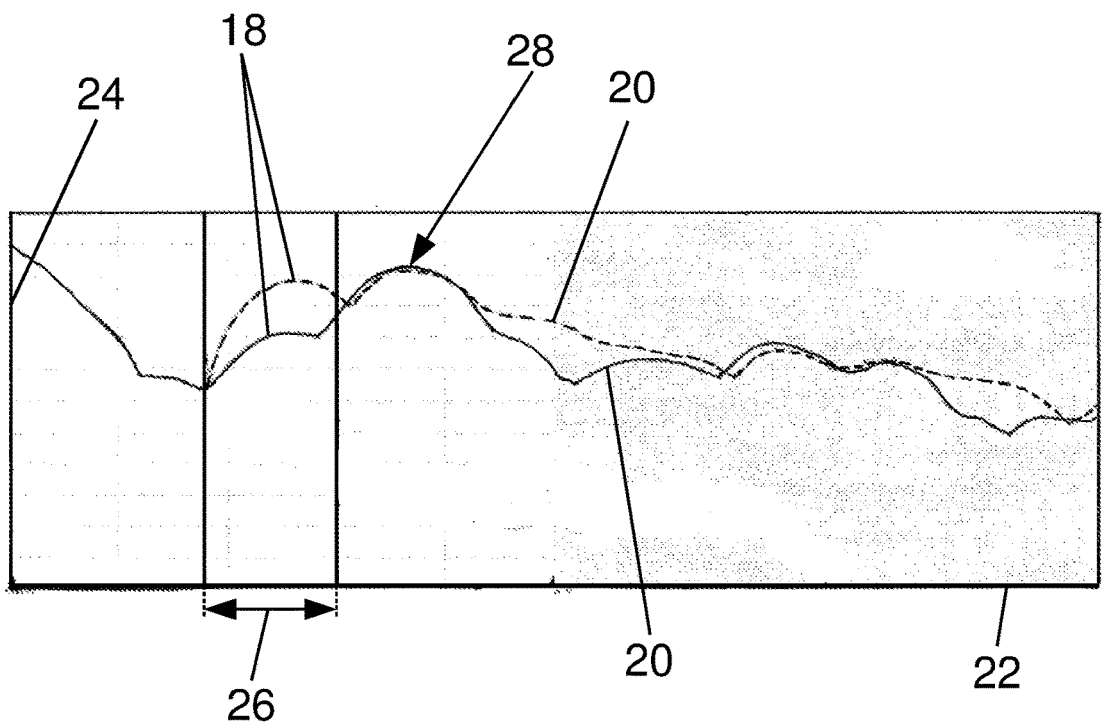
FIG. 2 is a line drawing evidencing echo curves with and without optimized adaptation.

FIG. 2 shows the echo curves 20 detected by the radar level gauge 12 on a time axis 22 as a function of the intensity on an intensity axis 24. FIG. 2 shows two echo curves 20, with the dot-dash curve illustrating the echo curve 20 without any adaptation, thus without any synthetic films 16, and the continuous curve showing the echo curve 20 with adaptation. The stray reflections 18 of the echo curves 20 are respectively embodied as maximums in a time window 26. Another maximum 28 shows the height of the fill level 8 of the fill good 6.

Figure 3:
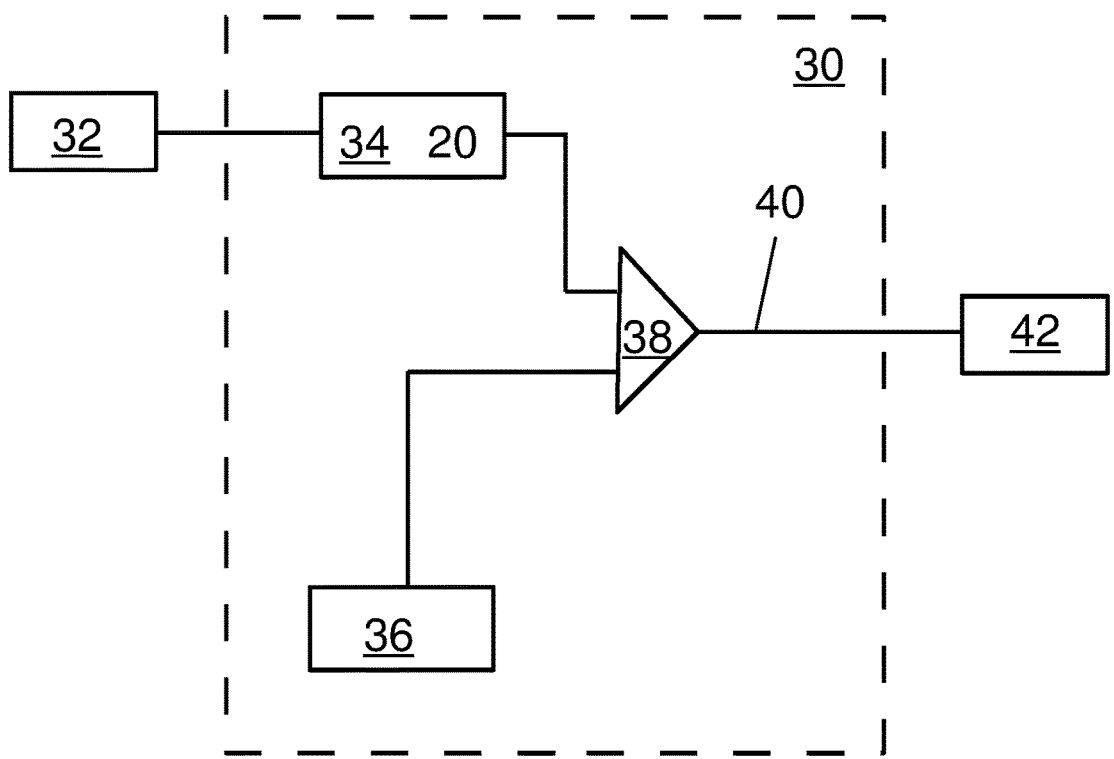
FIG. 3 is a line drawing evidencing a first example for a detection unit of the measuring arrangement according to the invention.

FIG. 3 shows a first example for a detection unit 30 by which the radiation signal detected by a detector 32 of the radar level gauge 12 is further processed. The signal detected by the detector 32 is saved in a storage unit 34 as a function of time in the form of an echo curve 20. In another storage unit 36 of the detection unit 30 a respective reference curve is saved, with its values individually being compared to the respective values of the echo curve in the storage unit 34 using a comparator 38.

If the values of the echo curve 20 in the storage unit 34 in the time window 26 are below the respective values of the reference curve in the storage unit 36, an ok-signal 40 is transmitted by the comparator 38 to a display device 42 so that the operator of the measuring device 1 knows that the stray reflections 18 are now sufficiently reduced and the measuring device 1 can be used for measuring the fill level 8 in the container 4.

If at least a portion of the values of the echo curve 20 in the selected time window 26 exceeds the respective values of the reference curve no ok-signal 40 is transmitted to the display device 42 and the operator knows that the stray reflections 18 of the measuring arrangement 1 have not yet been sufficiently minimized and by a further application or adhesion of synthetic films 16 the measuring arrangement can be further optimized.

Figure 4:
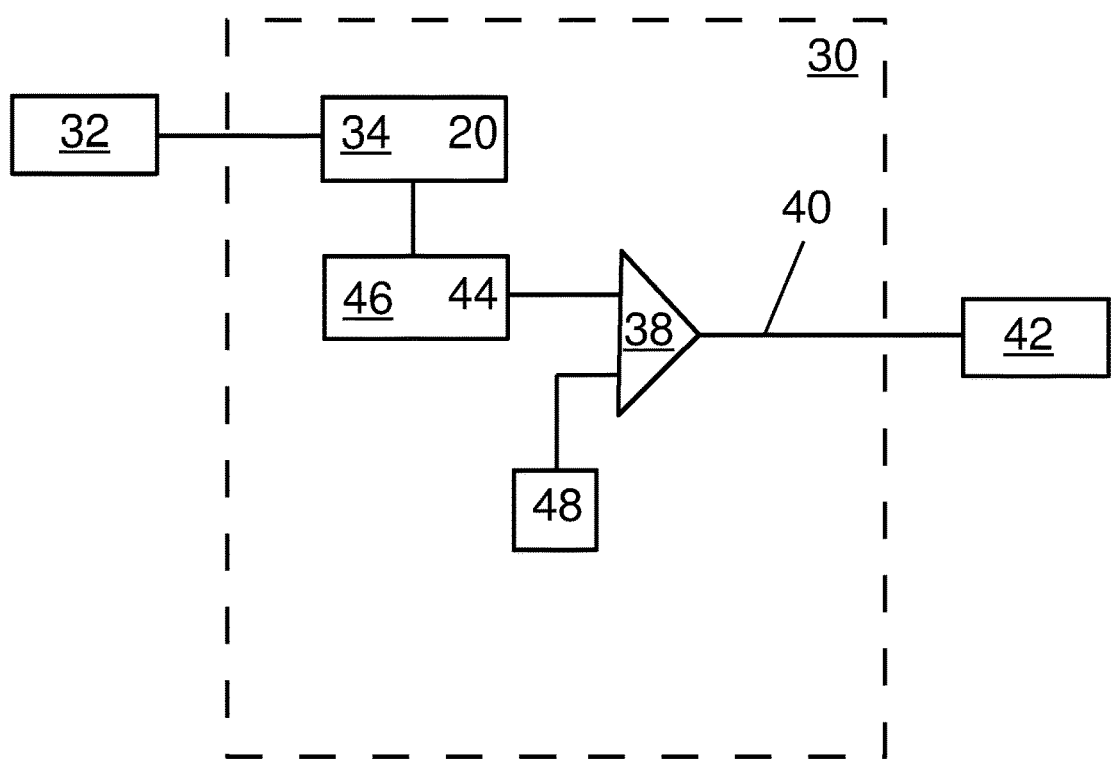
FIG. 4 is a line drawing evidencing a second example for a detection unit of the measuring arrangement according to the invention.

A second exemplary embodiment for a detection unit of the measuring arrangement 1 is shown in FIG. 4. The reflected values of the electromagnetic radiation determined by the detector 32 are saved as an echo curve 20 in the storage unit 34. From the values of the echo curve 20 measured in the time window 26 an energy value 44 is determined in an evaluation unit 46, for example by adding the measurements of the echo curve 20 determined within a certain time frame 26 and compared in the comparator 38 to the reference value 48.

If the reference value 48 is smaller than the energy value 44 the comparator 38 transmits an ok-signal 40 to the display device 42 such that the operator of the measuring arrangement 1 knows that the stray reflections 18 are now sufficiently reduced and the measuring arrangement 1 can be used for a sufficiently precise measuring of the fill level 8. If during the measurement of the fill level 8 no ok-signal 40 is transmitted to the display device 42, the operator of the measuring arrangement 1 knows that the adaptation 14 has not yet been optimized and the measuring arrangement can be further optimized, for example by adhering additional synthetic films 16 to the adaptation 14.

The invention has been explained using exemplary embodiments, without being limited to these embodiments. The features of the individual exemplary embodiments can be freely combined with functionally identically operating features of other exemplary embodiments or can be arbitrarily exchanged if here the inventive idea remains intact. For example, elements of the first exemplary embodiment of FIG. 3 can be combined with elements of the second exemplary embodiment of FIG. 4 such that the comparator 38 only issues an ok-signal 40 to the display device 42 when both the selected energy values are below the reference value and also the values of the echo curve 34 determined in the time window 26 are below the respective values of the reference curve, which are saved in the storage unit 36. It is also possible to display with a first display device that the selected energy values are below a reference value and to display with a second display unit that at least a portion of the values of the echo curve 20 in the selected time value 26 is below the respective values of the reference curve. Another display device may indicate for example that all values of the echo curve 20 in the selected time window 26 are below the respective values of the reference curve. The quality of the adaptation can for example be visualized by a simple multi-colored display in which e.g., red light indicates that only few or none of the criteria for good adaptation are fulfilled, yellow light indicates that at least some of the criteria for good adaptation are fulfilled, and green light indicates that all or almost all criteria for good adaptation are fulfilled, with the criteria here perhaps including for example energy values 44 determined in a time window 26 or the individual values of intensities detected in the time window 26, compared to the respective intensities of a reference curve.

LIST OF REFERENCE NUMBERS

1 Measuring arrangement
2 Interior chamber
4 Container
6 Fill good

8 Fill level
10 Wall, container lid, synthetic window, synthetic wall
12 Radar measuring device, Radar level gauge
14 Adaptation
16 Synthetic film
18 Stray reflection
20 Echo curve
22 Time axis
24 Intensity axis
26 Time window, certain time frame
28 Reflection maximum fill level
30 Detection unit
32 Detector
34 Storage echo curve
36 Storage reference curve
38 Comparator
40 Ok-signal
42 Display device
44 Energy value
46 Evaluation unit
48 Reference value The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A measuring arrangement comprising:
a container allowing that its interior is filled with a fill good,
a radar measuring device arranged outside the container and aligned to the interior chamber of the container, embodied as a radar level gauge, which emits electromagnetic waves of at least one wavelength and capable to detect the progression of the reflected electromagnetic radiation of at least one wavelength as an echo curve,
a wall arranged between the interior chamber of the container and the radar measuring device, at least partially permeable for the electromagnetic radiation of at least one wavelength,
a detection unit for detecting the echo curve,
an adaptation for reducing electromagnetic radiation reflected from the surfaces of the wall, wherein the adaptation comprises at least one self-adhesive synthetic film, or synthetic plate, or one glued to the wall or resting on the wall, at least partially permeable for electromagnetic radiation of at least one wavelength, which is glued or otherwise adhered to the wall such that the electromagnetic radiation pulses emitted by the radar level gauge penetrate at least one synthetic film, and
wherein the measurement arrangement is used to implement a method consisting of the steps:
a) placement or adhesion of the synthetic film on the wall,
b) irradiation of the interior chamber of the container preferably made from a synthetic material, through the synthetic film with the electromagnetic radiation pulse emitted by the radar level gauge and time-based recording of an intensity of the electromagnetic radiation reflected into the radar level gauge as the echo curve,
c) determination of a period of the echo curve in which the echo curve comprises at least a portion of the electromagnetic radiation reflected at the surfaces of the wall and the synthetic film and determination of an energy value of the radiation pulse detected in said period from the intensity of the reflected electromagnetic radiation recorded within said period,
d) placement or adhesion of another synthetic film onto the already placed or adhered synthetic film,
e) renewed irradiation of the interior chamber of the container through the synthetic film with another electromagnetic radiation pulse emitted by the radar level gauge, recording the echo curve and determination of the energy value of the radiation pulse detected within said period,
f) placement or adhesion of another synthetic film onto the synthetic film and subsequent execution of step e) if the most recently determined energy value is smaller than the previously determined energy value, and
g) saving the most recently determined energy value in a storage unit, if the most recently determined energy value is greater or identical to the previously determined energy value.

2. The measuring arrangement according to claim 1, wherein the detection unit comprises a storage unit in which at least a portion of the echo curve, which shows electromagnetic radiation reflected at the surfaces of the adaptation and the wall, can be saved as a function of time.

3. The measuring arrangement according to claim 2, wherein a time frame is determined in which the echo curve shows at least a portion of the electromagnetic radiation reflected by the surfaces of the wall.

4. The measuring arrangement according to claim 3, wherein the detection unit comprises a comparator, which compares the measurements of the echo curve at a certain time frame to respective values of a predetermined reference curve.

5. The measuring arrangement according to claim 3, wherein the detection unit comprises an evaluation unit, which determines an energy value from the progression of the echo curve within a certain time frame and transmits it to a comparator which compares the energy value to a predetermined reference value.

6. The measuring arrangement according to claim 4, wherein the detection unit transmits an ok-signal to a display device when a predetermined reference value is higher than the energy value determined in a certain time frame and when the measurements of the echo curve in this period are below the values of the reference curve equivalent to the respective measurements.

7. The measuring arrangement according to claim 6, wherein the display device represents an optic and/or acoustic display element, with the display device preferably being embodied as a LED or as an electronic display.

8. The measuring arrangement according to claim 1, wherein the adaptation comprises several, preferably two, three, four, or five synthetic films glued or otherwise adhered to each other in layers.

9. The measuring arrangement according to claim 8, wherein the synthetic films show approximately identical thicknesses.

10. The measuring arrangement according to claim 8, wherein the synthetic films are made from the same material, with the material being adjusted to the dielectricity constant of the wall.

11. The measuring arrangement of claim 3, wherein the detection unit comprises the detector, the storage unit and a comparator, wherein the detector determines reflected values of the electromagnetic radiation and saves such reflected values as the echo curve in the storage unit, then an evaluation unit measures the reflected values in the time frame as an energy value and compares such reflected values to a reference value.

\* \* \* \* \*